US011397606B2

(12) United States Patent
Lagerholm et al.

(10) Patent No.: US 11,397,606 B2
(45) Date of Patent: Jul. 26, 2022

(54) SYSTEMS AND METHODS FOR AUTOMATED MONITORING AND TROUBLESHOOTING OF UNKNOWN DEPENDENCIES IN A VIRTUAL INFRASTRUCTURE

(71) Applicant: T-Mobile USA, Inc., Bellevue, WA (US)

(72) Inventors: Stephan Lagerholm, Bellevue, WA (US); John Karlo Garcia, Bellevue, WA (US); Vincent Chong, Bellevue, WA (US); Sean Lee, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 421 days.

(21) Appl. No.: 16/540,294

(22) Filed: Aug. 14, 2019

(65) Prior Publication Data
US 2021/0049027 A1 Feb. 18, 2021

(51) Int. Cl.
*G06F 9/455* (2018.01)
*H04L 101/622* (2022.01)
(Continued)

(52) U.S. Cl.
CPC ...... *G06F 9/45558* (2013.01); *G06F 11/0787* (2013.01); *G06F 11/1469* (2013.01); *H04L 12/4641* (2013.01); *H04L 41/0654* (2013.01); *H04L 41/22* (2013.01); *H04L 43/0817* (2013.01); *H04L 43/0823* (2013.01);
(Continued)

(58) Field of Classification Search
CPC ............. G06F 9/45558; G06F 11/0787; G06F 11/1469; G06F 2009/45562; G06F 2009/45591; G06F 2009/45595; H04L 12/4641; H04L 41/0654; H04L 41/22;
(Continued)

(56) References Cited

U.S. PATENT DOCUMENTS 7,752,301 B1 7/2010 Maiocco et al.
8,225,313 B2 7/2012 Esfahany et al.
(Continued)

OTHER PUBLICATIONS

Virtualizing network services—the telecom cloud, Ericsson Review, The communications technology journal since 1924, Mar. 28, 2014, 10 pages.

*Primary Examiner* — Kenneth Tang
(74) *Attorney, Agent, or Firm* — Troutman Pepper Hamilton Sanders LLP; James E. Schutz; Christopher C. Close, Jr.

(57) ABSTRACT

Systems and methods for automated monitoring and troubleshooting of unknown dependencies in a virtual infrastructure are disclosed. In particular, systems and methods disclosed herein enable automation of processes for detecting network errors for virtual machines residing on virtual infrastructures and retrieving network addresses and physical ports associated with the errors. Aspects of the technology use the IEEE MAC address of the virtual instance to triage the L2 connectivity to determine the physical port to which the virtual instance is attached and then automatically report the port to the network operator. The system also provides a method of saving virtual instances that are in a faulty state so that instances can be investigated further by automated monitoring tools.

20 Claims, 7 Drawing Sheets

(51) Int. Cl.
*H04L 12/46* (2006.01)
*H04L 43/0823* (2022.01)
*G06F 11/14* (2006.01)
*H04L 43/0817* (2022.01)
*H04L 41/0654* (2022.01)
*H04L 41/22* (2022.01)
*G06F 11/07* (2006.01)

(52) U.S. Cl.
CPC .............. *H04L 61/6022* (2013.01); *G06F 2009/45562* (2013.01); *G06F 2009/45591* (2013.01); *G06F 2009/45595* (2013.01)

(58) Field of Classification Search
CPC ............ H04L 43/0817; H04L 43/0823; H04L 61/6022
USPC ............................................................. 718/1
See application file for complete search history.

(56) References Cited

U.S. PATENT DOCUMENTS

| | | | |
|---|---|---|---|
| 8,234,631 B2 | 7/2012 | Greifeneder et al. | |
| 8,473,627 B2 | 6/2013 | Astete et al. | |
| 8,555,274 B1 | 10/2013 | Chawla et al. | |
| 8,719,914 B2 | 5/2014 | Edwards et al. | |
| 8,855,017 B2 | 10/2014 | Lemieux | |
| 9,275,172 B2 | 3/2016 | Ostermeyer et al. | |
| 9,596,239 B2 | 3/2017 | Edwards et al. | |
| 9,612,853 B2 | 4/2017 | Agrawal et al. | |
| 9,881,167 B2 | 1/2018 | Chari et al. | |
| 10,127,059 B2 | 11/2018 | Astete et al. | |
| 2016/0087859 A1* | 3/2016 | Kuan | H04L 41/065 |
| | | | 715/736 |
| 2016/0359897 A1* | 12/2016 | Yadav | H04L 41/0668 |
| 2017/0083359 A1 | 3/2017 | Suzuki et al. | |
| 2017/0134246 A1 | 5/2017 | Amendjian et al. | |
| 2018/0109602 A1* | 4/2018 | Doctor | H04L 43/12 |
| 2018/0173549 A1* | 6/2018 | Browne | H04L 43/0817 |
| 2018/0365096 A1* | 12/2018 | Mamillapalli | G06F 11/0709 |
| 2019/0132211 A1* | 5/2019 | Yeung | H04L 41/0816 |
| 2019/0182101 A1* | 6/2019 | Kulshreshtha | H04L 41/069 |
| 2021/0240513 A1* | 8/2021 | Shevade | G06F 9/45558 |

\* cited by examiner

SYSTEMS AND METHODS FOR AUTOMATED MONITORING AND TROUBLESHOOTING OF UNKNOWN DEPENDENCIES IN A VIRTUAL INFRASTRUCTURE

FIELD OF THE INVENTION

The presently disclosed subject matter generally relates to systems and methods for network monitoring, and particularly to systems and methods for automated monitoring and troubleshooting of unknown dependencies in a virtual infrastructure.

BACKGROUND

Physical network infrastructures are difficult to manage. Changing the network configuration, or adding a new machine or storage device, typically are difficult manual tasks, thereby making such changes expensive and error prone. Further, such changes can take several hours or days to implement, thus limiting the rate at which reconfigurations to account for changing business demands can take place. In some instances, reconfigurations require new equipment and can take months to implement. And given the rigidity of such networks, it is important to ensure the network stability and reliability prior to and after deployment, which requires exhaustive testing prior to deployment and significant performance monitoring post deployment.

Virtual network infrastructures have been used to combat the rigidity of such physical network infrastructures. Virtual network infrastructures provide independence from the underlying physical network configuration by abstracting devices from the configuration of the real network. As these networks are not tied to specific hardware, they are easily changed and reconfigured. Accordingly, they can be deployed earlier in the development process and updated as needed. The major tradeoff for the increased flexibility afforded by virtual network infrastructures is that understanding the performance of a virtual network infrastructure is more complex than that of its physical network infrastructure counterparts. Such complexity results in unknown system dependencies, which can present challenges for monitoring the virtual system. This monitoring, however, is especially important given the model of deploying reconfigurations early and often.

The conventional approach to monitoring both physical and virtual networks is to monitor Key Performance Indicators (KPI), such as CPU, memory usage, and network packets in/out, to raise an alarm when an error condition (e.g., exceeded KPI threshold) is detected, and to rely on a highly skilled and time-constrained network engineer to troubleshoot and correct the specific network problem. One key limitation with such traditional monitoring systems is that they only can capture error conditions for KPIs that are known to the operator and configured in advance. Such systems cannot detect failures caused by unknown system dependencies.

Further, because service providers and services obviously depend on having a reliable network, a network engineer, or operator, they must quickly remediate the situation once a failure occurs. A metric exists specifically to monitor such response—Time to Repair (TTR). But due to the high degree of complexity of virtual network infrastructures, determining where a failure occurs can be quite cumbersome. One way of reducing the TTR for virtual infrastructure problems is to automate the process of pinpointing the location of the network problem.

Accordingly, there is a need for improved systems and methods for virtual network monitoring and, more specifically, for automated monitoring and troubleshooting of unknown dependencies in a virtual infrastructure. Examples of the present disclosure are directed to this and other considerations.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology.

DETAILED DESCRIPTION

Figure 1:
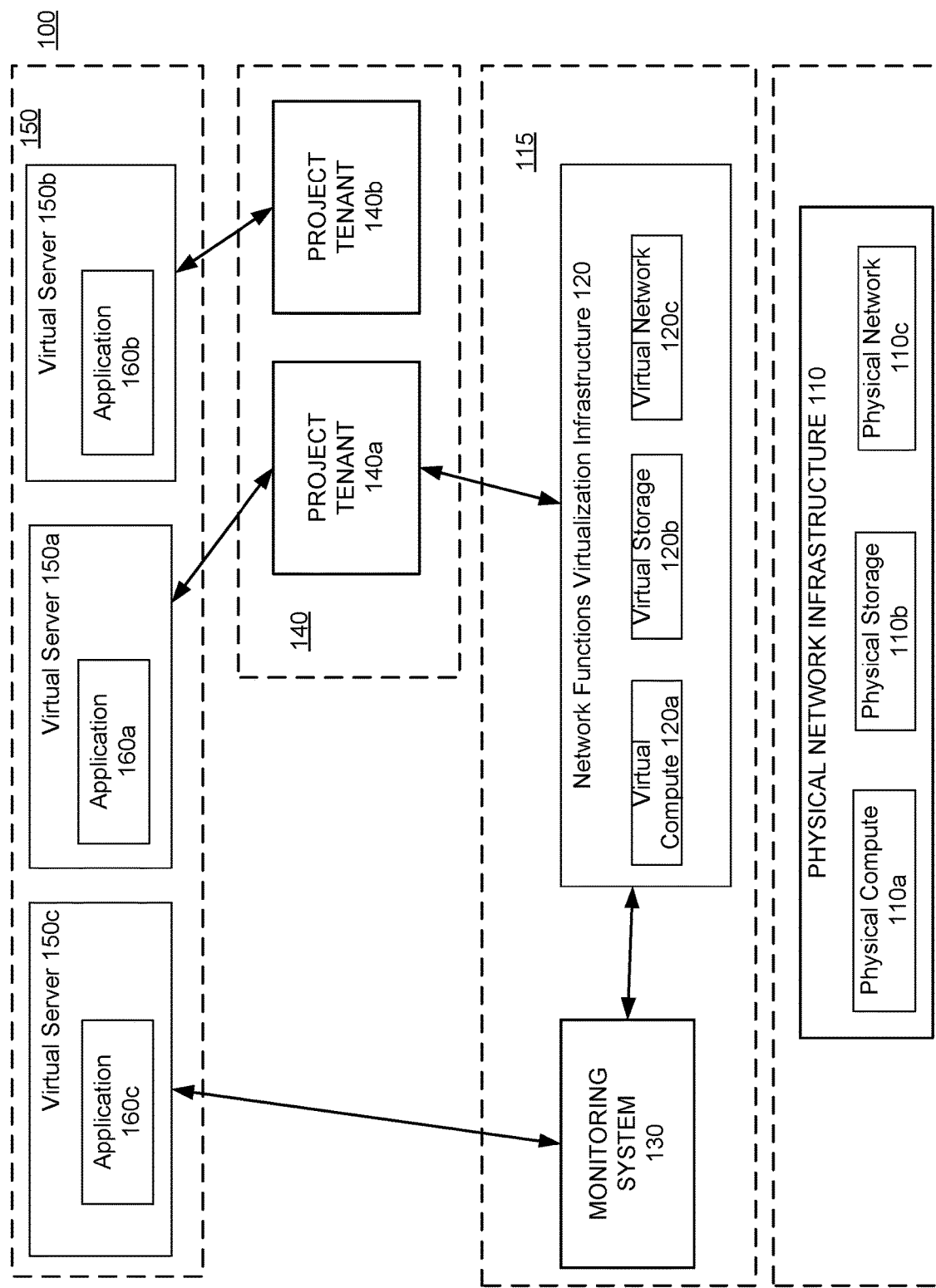
FIG. 1 is an example system environment for automated monitoring and troubleshooting of unknown dependencies in a virtual infrastructure that includes an application, at least one project tenant, a virtual network infrastructure, and a physical network infrastructure, in accordance with some examples of the present disclosure.

Network scalability has become increasingly popular in the data driven world. Increased demands for access have led to increases in strains put on the networks that provide that access. Virtual networks, previously discussed, which are essentially networks where software has been used to abstract physical computing resources away from the physical machines and into a virtual machine, provide a promising path forward in addressing future demands placed on networks. However, as discussed above, virtual networks are more complex, thus more challenging to monitor and troubleshoot. When network errors occur, TTR is critical in maintaining a stable and reliable network. In the related art, traditional systems and methods of automating network monitoring are limited in that they only can capture error conditions for network conditions that are known to an operator and preconfigured as part of such monitoring systems.

To this end, it is desirable to have improved automated monitoring systems for monitoring unknown dependencies in a virtual infrastructure. In examples of the present disclosure, the monitoring system automatically adds and then uses synthetic virtual instances meant to imitate actual tenant usage of the virtual infrastructure. The monitoring system then monitors the virtual infrastructure as the virtual instance runs, saves any image of any faulty instance, automatically gathers live network state associated with the underlying physical network infrastructure, and reports the results to a network monitor.

In some examples, the monitoring system may use the IEEE MAC address of the virtual to locate the physical port to which the virtual instance is attached. Once the port is found, the monitoring system may be further configured to capture the per port network error counters including, but not limited to, packet discards, frame errors, and various other relevant per port network error counters. The monitoring system may use such counters in determining the network status, which then can be reported to the operator. The port location (number and name) as well as the counters are useful information in any multi server deployment as it is time-consuming to identify the physical port each instance is connected to.

Some implementations of the disclosed technology will be described more fully with reference to the accompanying drawings. The disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It also is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Reference now will be made in detail to one or more examples of the disclosed technology, examples of which are illustrated in the accompanying drawings and disclosed herein. Wherever convenient, the same reference numbers will be used throughout the drawings to refer to the same or like parts.

FIG. 1 is an example system environment 100 into which a system for automated monitoring and troubleshooting of unknown dependencies in a virtual infrastructure can be provided, in accordance with some examples of the present disclosure. The components and arrangements shown in FIG. 1 are not intended to limit the disclosed examples as these components and features may vary. As shown in FIG. 1, the system environment 100 can include physical network infrastructure 110, virtualization layer 115, which can include Network Functions Virtualization Infrastructure 120 and monitoring system 130, one or more tenants, or project tenants, 140a-140m, and one or more virtual server VM 150a-150m. In some examples, one or more project tenants 140a-140m may be implemented on Network Functions Virtualization Infrastructure 120 and may allow one or more VMs 150a-150m to communicate with an external device (e.g., another VM 150 or a network associated with project tenant 140) using physical network infrastructure 110. In some examples, monitoring system 130 may communicate with Network Functions Virtualization Infrastructure 120 to simulate user transactions (e.g., creating/instantiating new virtual machines for use by project tenants 140a-140m) to determine the status and availability of various components of Network Functions Virtualization Infrastructure 120. Further, each VM 150a-150m may be configured to run one or more applications 160a-160m. Applications may be general applications intended to test the virtual network associated with the VM. Applications may further be tenant specific applications meant to accomplish one or more goals of the associated tenant.

Physical network infrastructure 110 can include hardware and software components. Examples of hardware components include mainframes; RISC (Reduced Instruction Set Computer) architecture-based servers; storage devices; and networks and networking components, COTS (Commercial off the Shelf) compute nodes, edge compute nodes, radio network components. For example, physical network infrastructure 110 may include physical servers (e.g., server 600), routers, data servers, computer terminals, network ports, physical access points or other computer-based physical systems. Examples of software components include network application server software, container software, operating systems and database software.

Network Functions Virtualization Infrastructure 120 can provide an abstraction layer from which the following examples of virtual entities may be provided: virtual machines (e.g., VM 500); virtual servers (e.g., server 600); virtual storage; virtual networks (e.g. Network Functions Virtualization Infrastructure 120), including virtual private networks; virtual applications; and virtual operating systems.

Project tenants 140a-140m may be consumers seeking to obtain data processing resources (e.g., Network Functions Virtualization Infrastructure 120), such as networks (physical or virtual), network bandwidth, servers, processing, memory, storage, applications, virtual machines, and software as a service from a remote provider, either as the primary means of providing business services, or on a temporary basis when needed.

In some examples, a tenant (e.g., project tenant 140) may be a business or other entity having its own data processing system resources, such as a computer network. The computer network provides a limited amount of processing capability and data storage resources. At certain times, the tenant may require data processing resources beyond those available in its computer network. For example, at certain times, the demand for data processing resources may be greater than the capability of the tenant's computer network. At these times, the response time of the tenant's computer network for some applications may increase to unacceptable levels. At those times when the tenant requires data processing resources beyond its own, the tenant may purchase data processing resources from a provider on a temporary basis. For example, in such a scenario, the tenant (e.g., project tenant 140) may obtain a virtual-machine-running remote network (e.g., Network Functions Virtualization Infrastructure 120) to obtain additional processing or storage resources or specific application functionality as a service on a temporary basis. In other examples, the tenant may be a business or other entity that does not have its own data processing system resources. Such tenants may obtain networks (physical or virtual), network bandwidth, servers, processing, memory, storage, applications, virtual machines, and software as a service from a remote provider who serves as the primary provider of business services.

In order to generate virtual machines, aspects of the disclosed technology can instantiate a virtual machine image. Virtual machine images may be stored in virtual storage that can be provisioned to create a virtual machine.

As will be understood, each of the virtual machine images is a set of files that are used to run one or more instances of the virtual machine. Each of the virtual machine images includes files that act as disk storage, a virtual machine definition, and various other files. The virtual machine definition is a template file that includes a set of attributes that defines a particular virtual machine. The attributes can include, for example, any name or identifying description assigned to the virtual machine, an amount of memory requested by the virtual machine, and a number of virtual processor units required by the virtual machine. Additionally, the virtual machine definition can include disks of a virtual machine, network interfaces of a virtual machine, input/output interfaces, any placement constraints, and preferences for the virtual machine, as well as any context of the virtual machine including files, disk images, or variables utilized by the virtual machine.

Monitoring system 130 may be a system component that is configured to automatically monitor and troubleshoot unknown dependencies in a virtual environment that includes one or more VMs 150, one or more project tenants 140, Network Functions Virtualization Infrastructure 120, and physical network infrastructure 110, in accordance with some examples of the present disclosure. Monitoring system 130 may be configured to monitor resource usage such as CPU usage, memory usage, and virtual machine network usage. In some examples, monitoring system 130 may be a centralized monitoring software. Additionally, in some examples, monitoring system 130 may include a centralized monitoring hardware incorporated in physical network infrastructure 110. Monitoring system 130 may include a graphical user interface that allows one or more operators to interact with monitoring system 130.

In some examples, monitoring system 130 may collect monitoring information from all virtual machines instantiated by the monitoring system 130 or by other tenants 140. Monitoring system 130 may use project tenant 140 instantiated virtual machines to generate synthetic virtual machine images to be used for synthetic system monitoring. For example, monitoring system 130 may replicate actual project tenant 140 virtual machines to replicate actual use cases.

As non-limiting examples, the one or more VMs 150a-150m may be cell phones, smartphones, laptop computers, tablets, or other personal computing devices that include the ability to communicate on one more different types of networks. Physical network infrastructure 110 and Network Functions Virtualization Infrastructure 120 may include one or more physical or virtual devices (e.g., servers, cloud servers, access points, etc.) or drives. Example computer architectures that may be used to implement monitoring system 130, VMs 150a-150m, one or more components of the project tenants 140a-140m, one or more components of Network Functions Virtualization Infrastructure 120, and one or more components of physical network infrastructure 110 are described below with reference to FIGS. 5 and 6.

Figure 2:
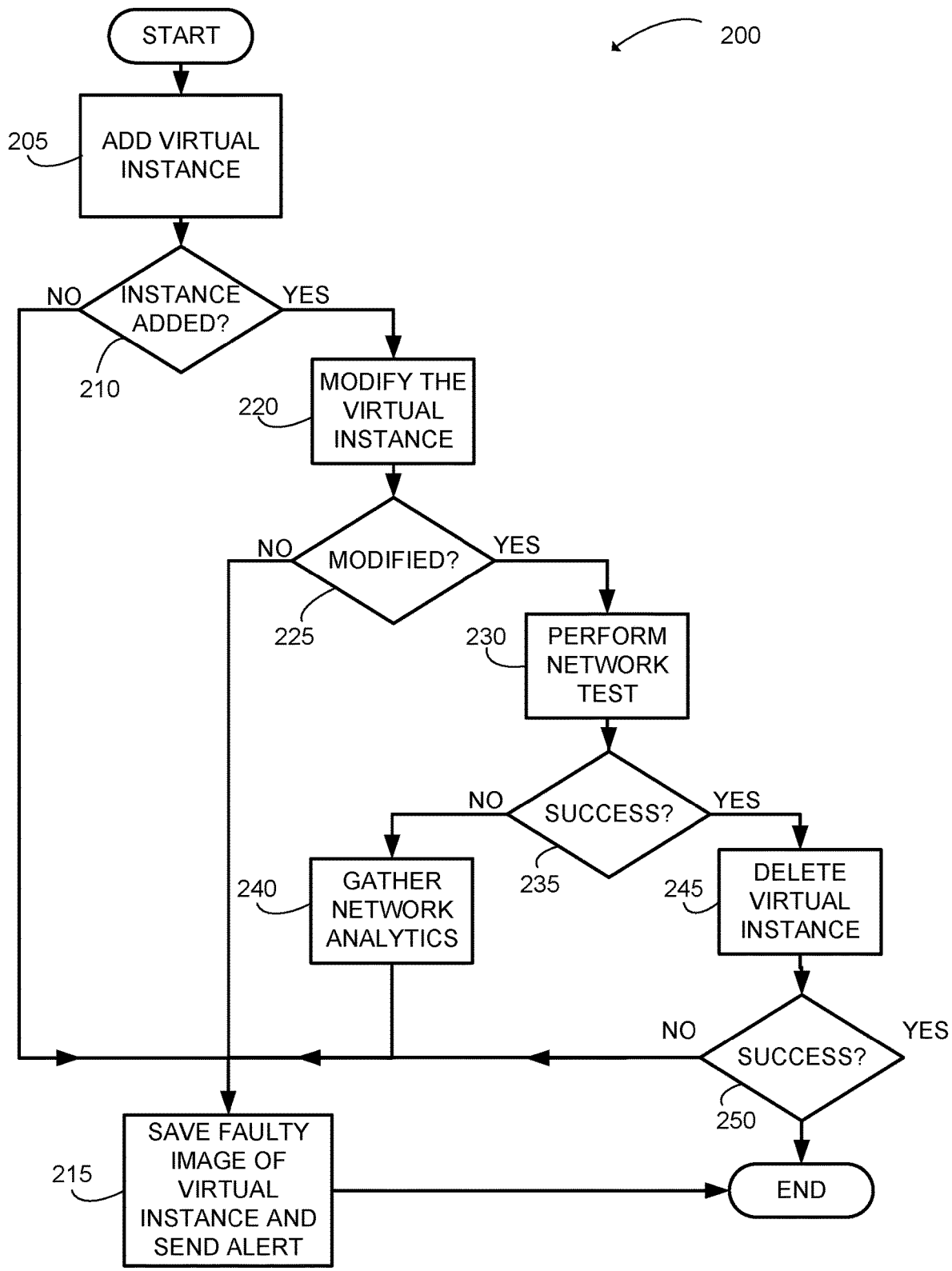
FIG. 2 is a flowchart depicting synthetic monitoring of a virtual network, in accordance with some examples of the present disclosure.

FIG. 2 is a flowchart of an example method 200 for synthetic monitoring of a virtual network. The flowchart illustrates the method 200 from the perspective of monitoring system 130. Monitoring system 130 may communicate with Network Functions Virtualization Infrastructure 120 to simulate user transactions (e.g., creating/instantiating new virtual machines for use by project tenants 140a-140m) to determine the status and availability of various components of Network Functions Virtualization Infrastructure 120. Further, monitoring system 130 may communicate with one or more elements of physical network infrastructure 110 to gather relevant network analytics.

As shown in FIG. 2, monitoring system 130 may add 205 a new instance of a virtual machine. For example, monitoring system 130 may instantiate an instance of a virtual machine that is stored on virtual storage provided by Network Functions Virtualization Infrastructure 120. In some examples, the instance image of the virtual machine is pre-loaded into storage as part of the software package of monitoring system 130. The monitoring system 130 may then determine 210 whether or not the instance of the virtual machine has been successfully added. For example, monitoring system 130 may verify that the virtual machine has been added to the Network Functions Virtualization Infrastructure 120.

If the virtual machine is successfully added, monitoring system 130 can then modify 220 the instance of the virtual machine. For example, monitoring system 130 may install an application on the virtual machine. As another example, monitoring system 130 may change a policy associated with the virtual machine. As a further example, monitoring system 130 may migrate from one compute node to another. Monitoring system 130 may also manually modify the name and status of the virtual machine as well as the resources allocated to the virtual machine. On the other hand, if the virtual machine is not successfully added, then monitoring system 130 can save 215 an instance of the faulty virtual instance and alert an operator. As will be appreciated, saving such instances allows an operator to do "post mortem" analysis on the instance to determine the root cause of the error, which in this case was unsuccessful instantiation of the virtual machine. Additionally, as previously discussed, automation is a key to bringing down the TTR for network errors, but automation of this sort historically has hinged on having known error conditions. Monitoring system 130 may use such saved instances for additional testing, thus increasing the catalog or known error conditions by providing an automated live network state as discussed further herein with reference to method 400.

As further shown in FIG. 2, monitoring system 130 can determine 225 whether or not the instance of the virtual machine has been successfully modified. For example, monitoring system 130 may verify that the instance have been migrated to a new host or that the resources has been updated to reflect the modification. As another example, where the modification involved installing an application on the virtual machine, monitoring system 130 may use the installed application to verify that the modification was successful.

If the virtual machine is successfully modified, then monitoring system 130 can use the instance of the virtual machine to perform a network test 230 on the Network Functions Virtualization Infrastructure 120. For example, once the virtual machine is successfully modified, monitoring system 130 may perform traditional network testing directed at determining relevant KPIs of Network Functions Virtualization Infrastructure 120. Once the Network Functions Virtualization Infrastructure 120 has confirmed that there are enough resources for the network test to proceed, monitoring system 130 may execute a series of tests involving send control messages to a the given address such as gateway of the project tenant 140, and other common known entities, such as DNS addresses. On the other hand, if the virtual machine is not successfully modified, then monitoring system 130 can save 215 the faulty virtual instance and alert an operator, as previously discussed.

Method 200 can further include monitoring system 130 determining 235 whether or not the network test has been successfully performed. For example, monitoring system 130 may have stored therewith data associated with certain KPI threshold values. Monitoring system 130 may then compare the observed KPI to the threshold values and, based on this comparison, may determine if the network test was successfully performed. For example, if the observed KPI values are all below the threshold values, monitoring system 130 may determine that the network test is successful. Another example, monitoring system 130 may determine that the network test is successful if the series of control message tests that were done are all return a successful response.

If the network test is successfully performed, then monitoring system 130 can delete 245 the instance of the virtual machine. On the other hand, if the network test fails, then monitoring system 130 can gather 240 network analytics, as discussed further herein with reference to method 400, and save 215 an image of the faulty virtual instance and alerts an operator, as discussed previously.

As further shown, monitoring system 130 can determine 250 whether or not the instance of the virtual machine has been successfully deleted. For example, monitoring system 130 may verify that the virtual machine has been removed from virtual memory included in the Network Functions Virtualization Infrastructure 120. As another example, monitoring system 130 may attempt to access the virtual machine to verify that it has been successfully deleted. If the instance of the virtual machine has been successfully deleted, then monitoring system 130 can terminate the monitoring process. On the other hand, if the instance of the virtual machine has not been successfully deleted, then as before, monitoring system 130 can save 215 an image of the faulty virtual instance and alert an operator.

Figure 3:
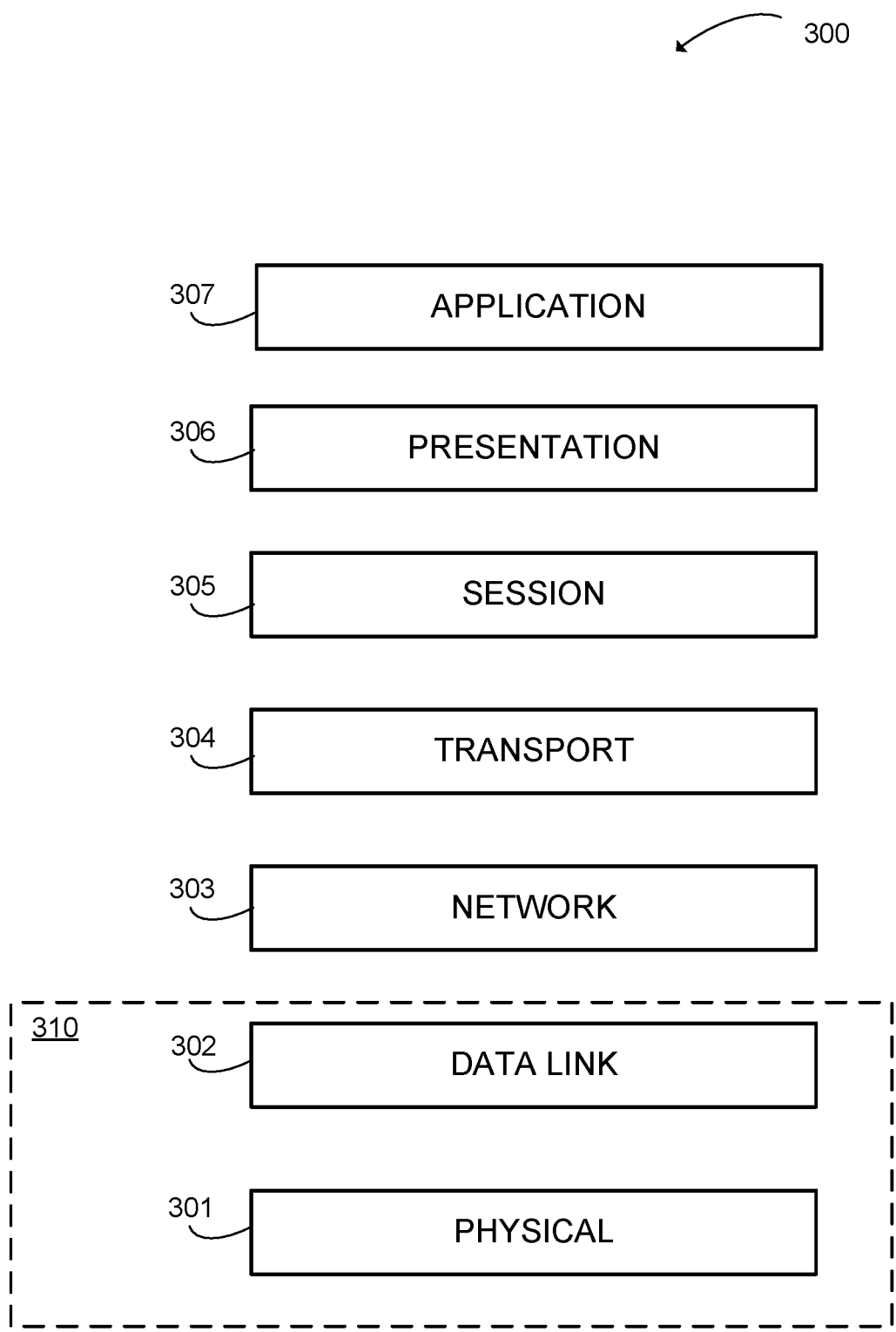
FIG. 3 is a diagram of example network layers, in accordance with some examples of the present disclosure.

FIG. 3 is a diagram of network layers 300 in accordance with examples of the present disclosure. As will be understood by one of skill in the art, network layers 300 relate to the Open Source Interconnection (OSI) 7-layer model. FIG. 3 shows physical layer 301, data link layer 302, network layer 303, transport layer 304, session layer 305, presentation layer 306, and application layer 307. In some implementations, monitoring system 130 may include testing protocols of one or more network layers 300. For example, monitoring system 130 may be configured for running scripts to determine Network Functions Virtualization Infrastructure 120 errors caused by one or more OSI network layers associated with physical network infrastructure 110 (e.g., layers 301 and 302), as represented by area 310 from the OSI Network Model. In an example, monitoring system 130 may run a script that uses the IEEE MAC address of a virtual instance to triage virtual and physical devices associated with data link layer 302 to determine the network element and physical port to which the virtual instance is attached. Once the port is found, the script may be further configured to capture the per port network error counters including, but not limited to, input/output error, input/output discard, overrun/underrun, bad etype, bad protocol, drop, collision, CRC and frame errors, and other relevant per port network error counters. Monitoring system 130 may use such counters in determining the network status. For example, if there is an increase in the counters from one instance to the next, then information about the counter and the size of the increase can be attached to the alerts discussed above with regards to 215 of method 200. Additionally, in some examples, monitoring system 130 may include scripts configured to use the IP address of a determined faulty port to further troubleshoot live network state, as further discussed below with reference to method 400.

Figure 4:
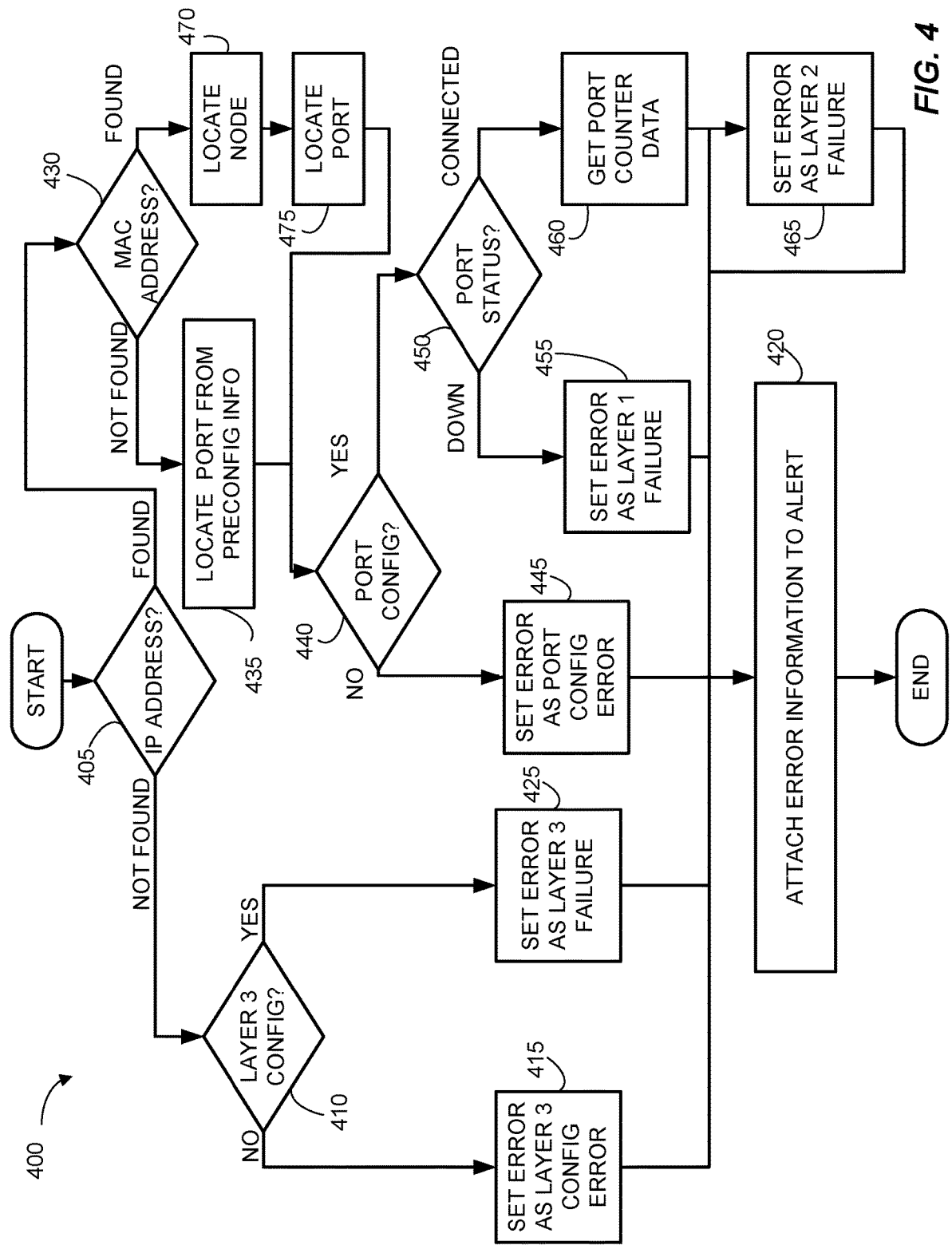
FIG. 4 is a flowchart depicting automated monitoring of live network state in a virtual network, in accordance with some examples of the present disclosure.

FIG. 4 is a flowchart for an example method 400 for automated monitoring of network state of a virtual network 120c. The flowchart illustrates the method 400 from the perspective of monitoring system 130. As in method 200, monitoring system 130 may communicate with Network Functions Virtualization Infrastructure 120 to simulate user transactions (e.g., creating/instantiating new virtual machines as project tenant 140m) as part of the monitoring process. Here, monitoring system 130 may further communicate with Network Functions Virtualization Infrastructure 120 and physical network infrastructure 110 to gather live network state to troubleshoot physical network infrastructure 110. For example, monitoring system 130 may communicate with one or more elements of physical network infrastructure 110 to determine the physical port associated with the instantiated virtual machine. By connecting to the physical infrastructure 110, monitoring system 130 may gather information from the OSI layers such as frame and packet level to determine security posture, network configuration errors, physical problems and errors with the optical networking components. Furthermore, we can gather statistics around flows to find top destinations and protocols.

As shown in FIG. 4, monitoring system 130 may search 405 for IP address of the virtual instance, which is dynamically assigned to Virtual instance 150a-m by Network Functions Virtualization Infrastructure 120 from the available Virtual Network 120c. Monitoring system 130 may search 405 through the Physical Infrastructure to locate the IP address of the Virtual Instance. Monitoring system 130 communicate with Physical Infrastructure and find advertised IP address information. As will be understood by one of skill in the art, an IP address is advertised in Layer 3 of the OSI layer, for reachability to the Virtual Instance.

If monitoring system 130 does not find the IP address of the virtual instance, it may determine 410 whether or not the Layer 3 Config is set up. As will be understood by one of skill in the art, the Layer 3 config is required to create a logical network connectivity for virtual machines (VMs) within a network. For example, if the Layer 3 Config is implemented correctly, and IP address advertisement is not found, monitoring system 130 may set 425 the error status as a Layer 3 failure in such Physical Infrastructure, as well as in Virtual Network. If the Layer 3 config is found not implemented correctly, monitoring system 130 may set 415 the error status as Layer 3 config error.

If monitoring system 130 does find the IP address of the virtual instance, monitoring system 130 may search 430 for the IEEE MAC address of the virtual instance. Monitoring system 130 may search through the Physical Infrastructure to locate the IEEE MAC address of the virtual machine. Monitoring system 130 may communicate to Physical Infrastructure to identify a node that learned the IEEE MAC address. As will be understood by one of skill in the art, the IEEE MAC address of the Virtual Instance is learned by node's port as soon as Virtual Instance send its first packet.

If monitoring system 130 does not find the IEEE MAC address of the virtual instance, it need to use a pre deployment configuration information to identify all possible port 435. For each port, monitoring system 130 will communicate with the Physical Infrastructure and identify the port configuration information 440. If the port configuration does not match the expected configuration, monitoring system 130 set 445 the error status as Port config error.

If monitoring system 130 locates the IEEE MAC address, monitoring system 130 may communicate with Physical Infrastructure to locate node 470. For example, monitoring system 130 may use the IEEE MAC address of the virtual instance to triage 430 the L2 connectivity and to find the physical node of physical network infrastructure 110 associated with the virtual instance. As further shown, monitoring system 130 may search 475 for the physical port of physical network infrastructure 110 to which the virtual instance is attached, After locating the physical port of physical network infrastructure 110 to which the virtual instance is attached, the monitoring device 130 may determine 450 the port status. If the port is DOWN, monitoring system 130 may set 455 the error status as a layer 1 failure. For example, monitoring system 130 may indicate that there are packet errors associated with data received from the physical port (e.g., packet flooding, packet misrouting, etc.). Monitoring system 130 may then attach 420 the error status to the alert.

On the other hand, if it is determined, based on the port status, that the port is connected, monitoring system 130 may retrieve or get 460 the port counter data and may set 465 the error status as a layer 2 failure. Monitoring System 130 may then attach 420 the error status to the alert, as previously discussed. For example, monitoring system 130 may indicate that corrupt data is being received from the location of the port, thus indicating the port is likely in an error state (e.g., there is interference with the network connection, the port could have partial component failure, etc.). In some examples, port counter data may include packet discards, frame errors, and various other relevant per port network error counters. The monitoring system 130 may use such counters in determining the network status, which then can be reported to the operator. In some examples, the monitoring system 130 may include port counter data in the error status reported to the operator. As will be appreciated, the port location (number and name) as well as the counters are useful information for operators of any multi server deployment as it can be time-consuming to identify the physical port each instance is connected to.

Figure 5:
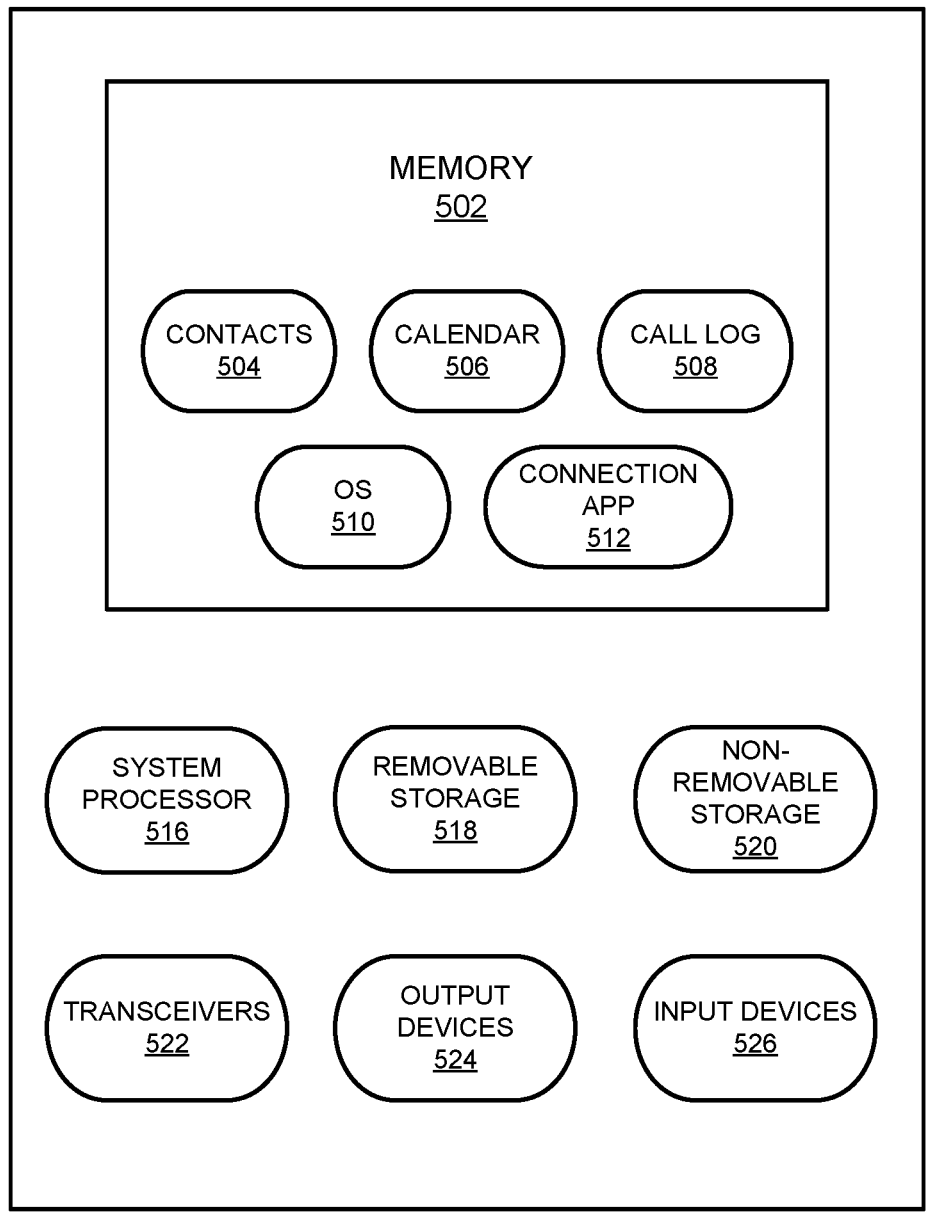
FIG. 5 is an example of a VM for use with the systems and methods disclosed herein, in accordance with some examples of the present disclosure.

As shown in FIG. 5, some, or all, of the system environment 100 and methods 200 and 400 may be performed by, and/or in conjunction with, VM 150. For clarity, VM 150 is described herein generally as a cell phone or smartphone. One of skill in the art will recognize, however, that system environment 100 and methods 200 and 400 also may be used with a variety of other electronic devices, such as, for example, tablet computers, laptops, desktops, and other network (e.g., cellular or IP network) connected devices from which a call may be placed, a text may be sent, and/or data may be received. These devices are referred to collectively herein as VM 150. VM 150 may comprise a number of components to execute the above-mentioned functions and apps. As discussed below, VM 150 may comprise memory 502 including many common features such as, for example, contacts 504, calendar 506, call log (or, call history) 508, operating system (OS) 510, and one or more applications, such as connection app 512.

VM 150 also may comprise one or more system processors 516. In some implementations, system processor(s) 516 can include central processing unit (CPU), graphics processing unit (GPU), or both CPU and GPU, or any other sort of processing unit. VM 150 also may include one or more of removable storage 518, non-removable storage 520, one or more transceiver(s) 522, output device(s) 524, and input device(s) 526. System processor 516 may be configured to receive a request to connect to an external device (e.g., another VM 150 or a network associated with project tenant 140). The request may be received through input device 526 and/or through automatic routing. System processor 516 may request connection with the external device.

In various implementations, memory 502 may be volatile (such as random-access memory (RAM)), non-volatile (such as read-only memory (ROM), flash memory, etc.), or some combination of the two. Memory 502 may include all, or part, of the functions 504, 506, 508, 512, and the OS 510 for the VM 150, among other things.

Memory 502 also may comprise contacts 504, which can include names, numbers, addresses, and other information about the user's business and personal acquaintances, among other things. In some examples, memory 502 also may include calendar 506, or other software, to enable the user to track appointments and calls, schedule meetings, and provide similar functions. In some examples, memory 502 also may comprise call log 508 of calls received, missed, and placed from VM 150. As usual, call log 508 may include timestamps for each call for use by the system environment 100. Of course, memory 502 also may include other software such as, for example, e-mail, text messaging, social media, and utilities (e.g., calculators, clocks, compasses, etc.).

Memory 502 also may include OS 510. Of course, OS 510 varies depending on the manufacturer of VM 150 and currently comprises, for example, iOS 12.1.4 for Apple products and Pie for Android products. OS 510 contains the modules and software that supports a computer's basic functions, such as scheduling tasks, executing applications, and controlling peripherals.

As mentioned above, VM 150 also may include connection app 512. Connection app 512 may perform some, or all, of the functions discussed above with respect to the methods 200 and 400, for interactions occurring between the VM 150 and an external device (e.g., another VM 150 or a network associated with project tenant 140).

VM 150 also may include additional data storage devices (removable and/or non-removable) such as, for example, magnetic disks, optical disks, or tape. Such additional storage is illustrated in FIG. 5 by removable storage 518 and non-removable storage 520. Removable storage 518 and non-removable storage 520 can store some, or all, of functions 504, 506, 508, 512, and OS 510.

Non-transitory computer-readable media may include volatile and nonvolatile, removable and non-removable tangible, physical media implemented in technology for storage of information, such as computer readable instructions, data structures, program modules, or other data. The memory 502, removable storage 518, and non-removable storage 520 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by VM 150. Any such non-transitory computer-readable media may be part of VM 150 or may be a separate database, databank, remote server, or cloud-based server.

In some implementations, transceiver(s) 522 may include any sort of transceivers known in the art. In some examples, transceiver(s) 522 can include a wireless modem to facilitate wireless connectivity with the other VMs, the Internet, and/or an intranet via a cellular connection. Further, transceiver(s) 522 may include a radio transceiver that performs the function of transmitting and receiving radio frequency communications via an antenna (e.g., Wi-Fi or Bluetooth®).

In other examples, transceiver(s) 522 may include wired communication components, such as a wired modem or Ethernet port, for communicating with the other VM or the provider's Internet-based network. In this case, transceiver(s) 522 can also enable VM 150 to communicate with project tenant(s) 140, as described herein.

In some implementations, output device(s) 524 includes any sort of output devices known in the art, such as a display (e.g., a liquid crystal or thin-film transistor (TFT) display), a touchscreen display, speakers, a vibrating mechanism, or a tactile feedback mechanism. In some examples, output device(s) 524 can play various sounds based on, for example, whether VM 150 is connected to a network (e.g., project tenant 140), the type of call being received (e.g., video calls vs. voice calls), the number of active calls, etc. In some examples, output device(s) 524 can play a sound or display a graphic when a new connection (e.g., with project tenant 140) is requested, a connection is successful, etc. Output device(s) 524 also include ports for one or more peripheral devices, such as headphones, peripheral speakers, or a peripheral display.

In various implementations, input device(s) 526 includes any sort of input devices known in the art. Input device(s) 526 may include, for example, a camera, a microphone, a keyboard/keypad, or a touch-sensitive display. A keyboard/keypad may be a standard push-button alphanumeric, multi-key keyboard (such as a conventional QWERTY keyboard), virtual controls on a touchscreen, or one or more other types of keys or buttons, and also may include a joystick, wheel, and/or designated navigation buttons, or the like.

Figure 6:
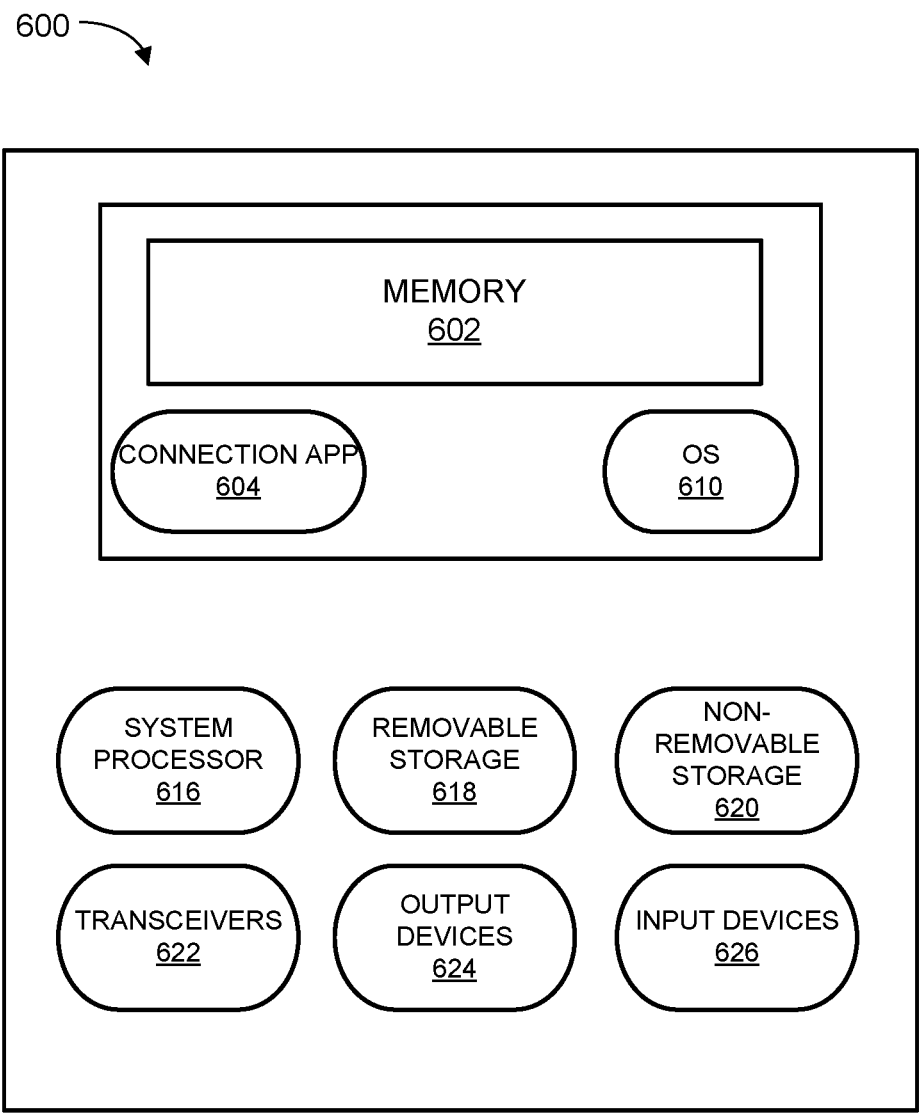
FIG. 6 is an example of a server for use with the systems and methods disclosed herein, in accordance with some examples of the present disclosure.

As shown in FIG. 6, the system environment 100 and methods 200 and 400 also may be used in conjunction with server 600 (e.g., monitoring system 130, VMs 150*a*-150*m*, one or more components of project tenants 140*a*-140*m*, one or more components of Network Functions Virtualization Infrastructure 120, and one or more components of physical network infrastructure 110). Server 600 can comprise, for example, a desktop or laptop computer, a server, bank of servers, or cloud-based server bank. Thus, while server 600 is depicted as single standalone servers, other configurations or existing components could be used. In some examples, server 600 may comprise existing network entities such as, for example, a home location register (HLR), home subscriber service (HSS), a third-generation partnership project authentication, authorization, and accounting (3GPP AAA) server, or another server or component. Server 600 may implement aspects of monitoring system 130, VMs 150*a*-150*m*, one or more components of project tenants 140*a*-140*m*, one or more components of Network Functions Virtualization Infrastructure 120, and/or one or more components of physical network infrastructure 110.

Server 600 may comprise a number of components to execute the above-mentioned functions and apps. As discussed below, server 600 may comprise memory 602 including many common features such as, for example, operating systems. In various implementations, memory 602 may be volatile (such as random-access memory (RAM)), non-volatile (such as read only memory (ROM), flash memory, etc.), or some combination of the two. Memory 602 may include all, or part, of the functions of connection app 604, among other things.

Memory 602 also may include OS 610. Of course, OS 610 varies depending on the manufacturer of the server 600 and the type of component. Many servers, for example, run Linux or Windows Server. Dedicated cellular routing servers may run specific telecommunications OS 610. OS 610 contains the modules and software that supports a computer's basic functions, such as scheduling tasks, executing applications, and controlling peripherals.

As shown in FIG. 6, server 600 can include connection app 604, which may provide communication between server 600 and external systems (e.g., VM 150, project tenant 140, and/or other external device). Server 600 also may comprise one or more system processors 616. In some implementations, system processor(s) 616 can include a central processing unit (CPU), a graphics processing unit (GPU), or both CPU and GPU, or any other sort of processing unit. Server 600 also may include one or more of removable storage 618, non-removable storage 620, one or more transceiver(s) 622, output device(s) 624, and input device(s) 626. System processor 616 may be configured to receive a request to connect to an external device (e.g., VM 150 or another server 600).

Server 600 also may include additional data storage devices (removable and/or non-removable) such as, for example, magnetic disks, optical disks, or tape. Such additional storage is illustrated in FIG. 6 by removable storage 618 and non-removable storage 620. Removable storage 618 and non-removable storage 620 may store some, or all, of OS 610 and connection app 604.

Non-transitory computer-readable media may include volatile and nonvolatile, removable and non-removable tangible, physical media implemented in technology for storage of information, such as computer readable instructions, data structures, program modules, or other data. Memory 602, removable storage 618, and non-removable storage 620 all are examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which may be used to store the desired information and which can be accessed by server 600. Any such non-transitory computer-readable media may be part of server 600 or may be a separate database, databank, remote server, or cloud-based server.

In some implementations, transceiver(s) 622 include any sort of transceivers known in the art. In some examples, transceiver(s) 622 may include a wireless modem to facilitate wireless connectivity with VMs 150, additional servers, the Internet, and/or an intranet via a cellular connection. Further, transceiver(s) 622 may include a radio transceiver that performs the function of transmitting and receiving radio frequency communications via an antenna (e.g., Wi-Fi or Bluetooth®). In other examples, transceiver(s) 622 may include wired communication components, such as a wired modem or Ethernet port, for communicating with other VMs 150 or the provider's Internet-based network.

In some implementations, output device(s) 624 may include any sort of output devices known in the art, such as a display (e.g., a liquid crystal or thin-film transistor (TFT) display), a touchscreen display, speakers, a vibrating mechanism, or a tactile feedback mechanism. In some examples, the output devices may play various sounds based on, for example, whether the server 600 is connected to a network, the type of data being received (e.g., a match vs. a request for service listings), when SIM-OTA messages are being transmitted, etc. Output device(s) 624 also may include ports for one or more peripheral devices, such as headphones, peripheral speakers, or a peripheral display.

In various implementations, input device(s) 626 includes any sort of input device known in the art. For example, input device(s) 626 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and also may include a joystick, wheel, and/or designated navigation buttons, or the like.

Figure 7:
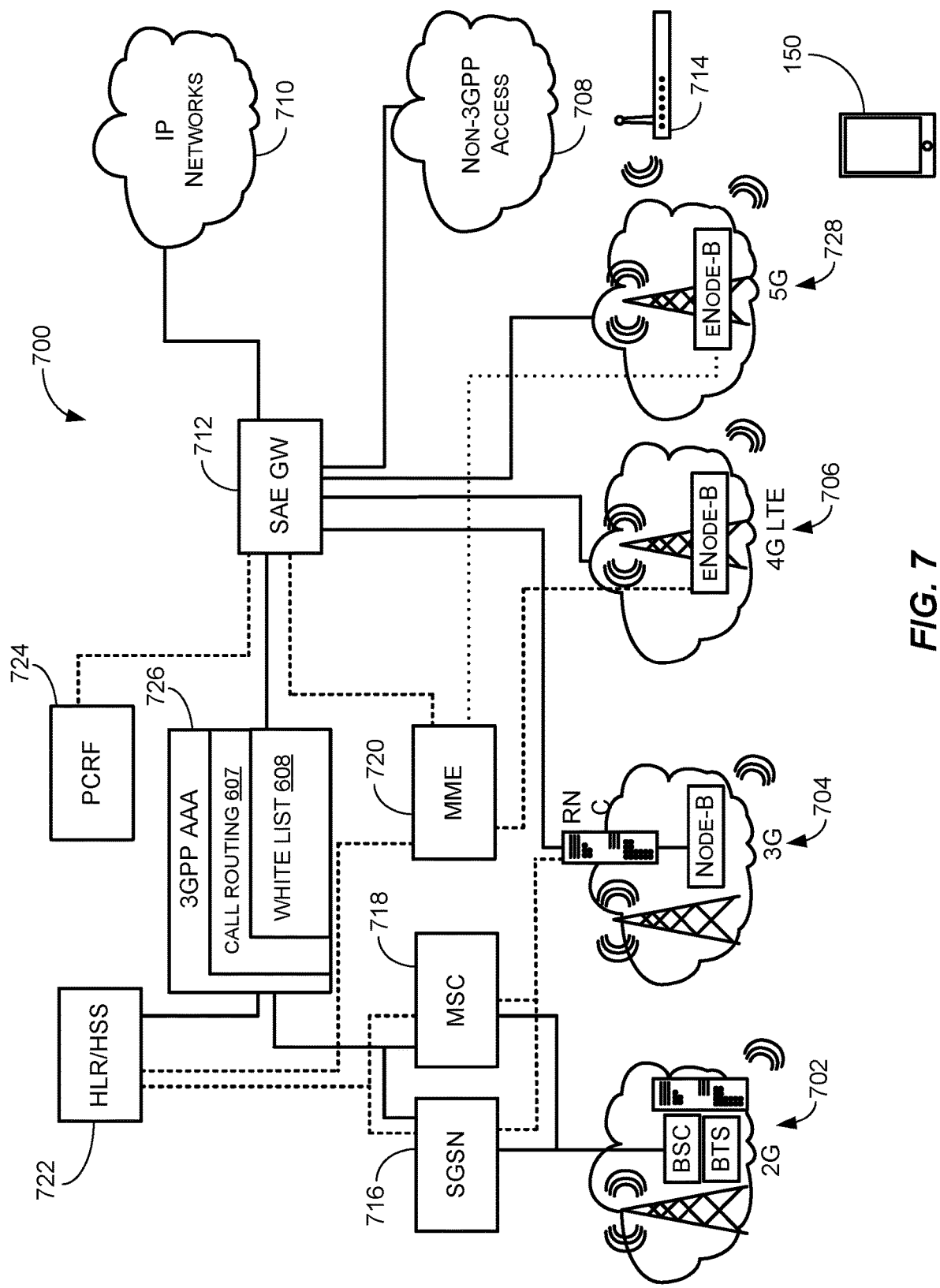
FIG. 7 is an example cellular and internet protocol network for use with some examples of the present disclosure.

FIG. 7 depicts conventional cellular network 700 including 2G 702, 3G 704, 4G long-term evolution (LTE) 706, and 5G 728 components. Of course, future technologies, such as, for example, 7G and device-to-device (D2D) components, also could be included and are contemplated herein. Many of the "back-end" components of network 700 could handle some, or all, of system environment 100 and methods 200 and 400 associated with automated monitoring and troubleshooting of unknown dependencies in a virtual infrastructure.

As is known in the art, data may be routed from the Internet or other sources using circuit switched modem connection (or non-3GPP connection) 708, which provides relatively low data rates, or via IP-based packet switched 710 connections, which results is higher bandwidth. 4G LTE 706, which is purely IP-based, essentially "flattens" the architecture, with data going straight from the internet to service architecture evolution gateway (SAE GW) 712 to evolved Node B transceivers 706, enabling higher throughput. VM 150 also has wireless local area network (WLAN) 714 capabilities, in some cases enabling even higher throughput. In some cases, cellular carriers may use WLAN communications in addition to, or instead of, cellular communications to supplement bandwidth.

Serving GPRS support node (SGSN) 716 is a main component of the general packet radio service (GPRS) network, which handles all packet switched data within the network 700 (e.g., the mobility management and authentication of the users). MSC 718 essentially performs the same functions as SGSN 716 for voice traffic. MSC 718 is the primary service delivery node for global system for mobile communication (GSM) and code division multiple access (CDMA), responsible for routing voice calls and short messaging service (SMS) messages, as well as other services (such as conference calls, fax, and circuit switched data). MSC 718 sets up and releases the end-to-end connection, handles mobility and hand-over requirements during the call, and takes care of charging and real time pre-paid account monitoring.

Similarly, mobility management entity (MME) 720 is the key control node for 4G LTE network 706 and 5G 728. It is responsible for idle mode VM 150 paging and tagging procedures including retransmissions. MME 720 is involved in the bearer activation/deactivation process and is also responsible for choosing SAE GW 712 for VM 150 at the initial attach and at time of intra-LTE handover involving Core Network (CN) node relocation (i.e., switching from one cell tower to the next when traveling). MME 720 is responsible for authenticating the user (by interacting with HSS 722 discussed below). The Non-Access Stratum (NAS) signaling terminates at MME 720, and it also is responsible for generation and allocation of temporary identities to VM 150. MME 720 also checks the authorization of VM 150 to camp on the service provider's HPLMN or VPLMN and enforces VM 150 roaming restrictions on the VPLMN. MME 720 is the termination point in the network for ciphering/integrity protection for NAS signaling and handles the security key management. MME 720 also provides the control plane function for mobility between 4G LTE 706 and 2G 702/3G 704 access networks with an S3 interface terminating at MME 720 from SGSN 716. MME 720 also terminates an S7a interface toward home HSS 722 for roaming VM 150.

Referring to 5G 728, MME 720 may be configured to respond to an initial attach request by sending a create session request to a network slice selector, also referred to herein as a slice selector and/or a network selector. The create session request may be sent over a logical communication interface that is referred to as an NG4 interface. The NG4 interface typically is used for messaging between the control plane function and the user plane forwarding function of a 5G network. Aspects of the present disclosure may be implemented within containerization of Software Defined Networks (SDN) of 5G nodes, and/or Network Function Virtualization (NfV). As will be understood by one of ordinary skill, SDN decouples traditionally decentralized network control from the physical devices, enabling programmatic control and infrastructure abstraction. Applications, network services, and/or network functions (e.g., NfV) may be implemented within containers of the SDN. The underlying systems (e.g., 5G 728) may capture images of the containers instantiated thereon, attest to the container images to a distributed ledger, and/or verify an anomaly status of other containers/systems prior to connection.

In response to receiving a create session request, the network slice selector may determine which of the available network slices should be used to provide services for VM 150 and may redirect the create session request to the selected network slice. For example, the create session request may be directed to a gateway component of the selected network slice. Specific for a 5G network, the gateway component may comprise a user plane forwarding function.

HSS/HLR 722 is a central database that contains user-related and subscription-related information. The functions of HSS/HLR 722 include functionalities such as mobility management, call and session establishment support, user authentication and access authorization. HSS, which is used for LTE connections, is based on the previous HLR and Authentication Center (AuC) from CGMA and GSM technologies, with each serving substantially the same functions for their respective networks.

Policy and charging rules function (PCRF) 724 is a software node that determines policy rules in network 700. PCRF 724 generally operates at the network core and accesses subscriber databases (e.g., HSS/HLR 722) and other specialized functions, such as enhanced e911 call handling, in a centralized manner. PCRF 724 is the main part of network 700 that aggregates information to and from network 700 and other sources (e.g., IP networks 710). PCRF 724 may support the creation of rules and then may automatically make policy decisions for each subscriber active on network 700. PCRF 724 also may be integrated with different platforms like billing, rating, charging, and subscriber database or also may be deployed as a standalone entity.

Finally, 3GPP AAA server 726 performs authentication, authorization, and accounting (AAA) functions and also may act as AAA proxy server. For WLAN 714 access to (3GPP) IP networks 710 3GPP AAA Server 726 provides authorization, policy enforcement, and routing information to various WLAN components. 3GPP AAA Server 726 may generate and report charging/accounting information, performs offline charging control for WLAN 714, and perform various protocol conversions when necessary.

While several possible examples are disclosed above, examples of the present disclosure are not so limited. While system environment 100 and methods 200 and 400 above are discussed with reference to use with cellular communications, for instance, system environment 100 and methods 200 and 400 can be used for other types of wired and wireless communications. In addition, while various functions are discussed as being performed on monitoring system 130, one or more project tenants 140a-140m, and one or more virtual server ("VM") 150a-150m, other components could perform the same or similar functions without departing from the spirit of the present disclosure.

The specific configurations, machines, and the size and shape of various elements can be varied according to particular design specifications or constraints requiring VM 150, server 600, system environment 100, network 700, or method 200 or 400 constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions also may be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one example," "an example," "some examples," "various examples," "one implementation," "an implementation," "example implementation(s)," "various implementations," "some implementations," etc., indicate that the implementation(s) or example(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for automated monitoring and troubleshooting of unknown dependencies in a virtual infrastructure, the system comprising:
    a physical network infrastructure;
    a virtual network infrastructure;
    one or more project tenants; and
    a monitoring system comprising:
        one or more processors configured to execute instructions to:
            add a virtual machine to the virtual network infrastructure;
            determine if the virtual machine was successfully added;
            if the virtual machine was not successfully added, (i) save an image of the virtual machine, and (ii) transmit, to a network operator, an error report; and
            if the virtual machine was successfully added:
                modify the virtual machine;
                determine if the virtual machine was successfully modified;
                if the virtual machine was not successfully modified, (i) save an image of the virtual machine, and (ii) transmit, to a network operator, an error report; and
                if the virtual machine was successfully modified:
                    determine a network status;
                    if the network status does not indicate a problem with the network, delete the virtual machine; and
                    if the network status indicates a problem with the network, (i) gather live network state, (ii) save an image of the virtual machine, and (iii) transmit, to the network operator, an error report.

2. The system of claim 1, wherein the monitoring system further comprises a graphical user interface and wherein reporting an error to a network operator comprises displaying an error message on the graphical user interface.

3. The system of claim 1, wherein the one or more processors are further configured to execute the instructions to:
    monitor activity data representing actions taken by a tenant associated with the virtual infrastructure; and
    generate, based on the activity data, a synthetic virtual machine.

4. The system of claim 3, wherein the virtual machine and the synthetic virtual machine are the same.

5. The system of claim 1, wherein gathering live network state comprises:
    determining, based at least in part on an IEEE MAC address associated with the virtual machine, a physical port of the physical network infrastructure associated with the virtual machine;
    receiving, from the physical port, port error data associated with per port network error counters; and
    attaching, to the error report, network analytics data comprising (1) port location data indicating the physical port of the physical network infrastructure associated with the virtual machine and (2) the port error data.

6. The system of claim 5, wherein gathering live network state further comprises:
    comparing port error data to previously gathered port error data;
    generating a comparison report detailing the changes in port error data as compared to the previously gathered port error data; and
    attaching, to the error report, the comparison report.

7. The system of claim 1, wherein modifying the virtual machine comprises installing an application on the virtual machine.

8. The system of claim 7, wherein determining if the virtual machine was successfully modified comprises executing the application installed on the virtual machine.

9. The system of claim 1, wherein determining a network status comprises testing key performance indicators associated with the virtual machine.

10. The system of claim 9, wherein key performance indicators are associated with key performance indicator values and wherein the network status indicates a problem with the network when one or more key performance indicator values is below a predetermined threshold.

11. The system of claim 1, wherein the one or more processors are further configured to execute the instructions to:
    retrieve the image of the virtual machine;
    instantiate, based on the image of the virtual machine, a new instance of the virtual machine on the virtual network infrastructure;
    generate a graphical user interface associated with the virtual machine; and
    present the graphical user interface to a network operator.

12. A method for automated monitoring and troubleshooting of unknown dependencies in a virtual network infrastructure, the method comprising:
    adding a virtual machine to the virtual network infrastructure;
    determining if the virtual machine was successfully added;
    if the virtual machine was not successfully added, (i) saving an image of the virtual machine, and (ii) reporting an error to a network operator; and
    if the virtual machine was successfully added:
        modifying the virtual machine;
        determining if the virtual machine was successfully modified;

if the virtual machine was not successfully modified, (i) saving an image of the virtual machine, and (ii) reporting an error to a network operator; and if the virtual machine was successfully modified:
determining a network status;
if the network status does not indicate a problem with the network, deleting the virtual machine; and
if the network status indicates a problem with the network, (i) gathering live network state, (ii) saving an image of the virtual machine, and (iii) reporting an error to a network operator.

13. The method of claim 12, further comprising:
monitoring activity data associated with actions taken by a tenant associated with the virtual infrastructure; and
generating, based at least in part on the activity data, a synthetic virtual machine.

14. The method of claim 13, wherein the virtual machine and the synthetic virtual machine are the same.

15. The method of claim 12, wherein determining a network status comprises testing key performance indicators associated with the virtual machine.

16. The method of claim 15, wherein key performance indicators are associated with key performance indicator values and wherein the network status indicates a problem with the network when one or more key performance indicator values is below a predetermined threshold.

17. A system for automated monitoring and troubleshooting of unknown dependencies in a virtual infrastructure, the system comprising:
a physical network infrastructure;
a virtual network infrastructure;
one or more project tenants; and
a monitoring system comprising one or more processors configured to execute instructions to:
monitor activity data associated with actions taken by a tenant associated with the virtual infrastructure;
generate, based on the activity data, a synthetic virtual machine;
add the synthetic virtual machine to the virtual network infrastructure;
monitor the synthetic virtual machine to determine if an error state is detected;
if an error state is not detected, delete the synthetic virtual machine; and
if an error state is detected:
determine virtual machine information comprising at least an IEEE MAC address associated with the synthetic virtual machine;
determine, based at least in part on the IEEE MAC address associated with the synthetic virtual machine, a physical port of the physical network infrastructure associated with the synthetic virtual machine;
determine a port status comprising information regarding a connection status of the physical port with respect to the virtual infrastructure;
if the port status indicates that the port is not connected, set a network error flag to indicate a layer 1 failure;
if the port status indicates that the port status is connected, set the network error flag to indicate a layer 2 error;
attach the network error flag to an error report; and
transmit the error report to a network operator.

18. The system of claim 17, wherein the monitoring system is further configured to monitor resource usage, such resource usage including one or more of CPU usage, memory usage, and virtual machine network usage.

19. The system of claim 17, wherein the monitoring system comprises dedicated hardware components of the physical network infrastructure.

20. The system of claim 19 wherein the dedicated hardware components of the physical network infrastructure comprise a physical server configured to access all components of the physical network infrastructure and the virtual network infrastructure.

* * * * *